US006828709B2

(12) United States Patent
Grantz et al.

(10) Patent No.: US 6,828,709 B2
(45) Date of Patent: Dec. 7, 2004

(54) MOTOR HAVING A FLUID DYNAMIC BEARING WITH A RADIAL CAPILLARY SEAL AND RE-CIRCULATION

(75) Inventors: Alan Lyndon Grantz, Aptos, CA (US); Anthony J. Aiello, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/348,699

(22) Filed: Jan. 21, 2003

(65) Prior Publication Data

US 2004/0032175 A1 Feb. 19, 2004

Related U.S. Application Data

(60) Provisional application No. 60/404,711, filed on Aug. 19, 2002.

(51) Int. Cl.[7] .............................. H02K 7/08; F16C 32/06
(52) U.S. Cl. ........................ 310/90; 384/110; 360/99.08
(58) Field of Search ................................ 384/100, 107, 384/108, 110, 124, 130, 137; 310/90, 90.5; 360/99.08

(56) References Cited

U.S. PATENT DOCUMENTS

| 4,798,476 | A | | 1/1989 | Sakatani et al. ............ 384/108 |
|---|---|---|---|---|
| 5,579,579 | A | * | 12/1996 | Chen ........................... 29/898 |
| 5,715,116 | A | | 2/1998 | Moritan et al. .......... 360/99.08 |
| 5,822,846 | A | | 10/1998 | Moritan et al. ............... 29/598 |
| 5,952,752 | A | * | 9/1999 | Kim ............................. 310/90 |
| 6,126,320 | A | * | 10/2000 | Ichiyama .................... 384/112 |
| 6,236,129 | B1 | | 5/2001 | Yamashita ................... 310/90 |
| 6,364,532 | B1 | | 4/2002 | Yoshikawa et al. ......... 384/107 |
| 6,549,366 | B1 | * | 4/2003 | Ichiyama ................. 360/97.03 |
| 6,712,513 | B2 | * | 3/2004 | Tanaka et al. .............. 384/100 |

* cited by examiner

*Primary Examiner*—Thanh Lam
*Assistant Examiner*—Judson H. Jones
(74) *Attorney, Agent, or Firm*—Morrison & Foerster LLP (57) ABSTRACT

The invention is a fluid dynamic bearing motor featuring a stationary assembly supported from a base, a rotating assembly supported on the stationary assembly, a fluid dynamic bearing in a gap between the stationary and rotating assemblies, a radial capillary seal is defined proximate a first end of the gap, and at least one re-circulation hole extending from the radial capillary seal to a second end of the gap.

21 Claims, 6 Drawing Sheets

MOTOR HAVING A FLUID DYNAMIC BEARING WITH A RADIAL CAPILLARY SEAL AND RE-CIRCULATION

CROSS REFERENCE TO RELATED APPLICATIONS

This application claims the priority of U.S. Provisional Application No. 60/404,711, filed Aug. 19, 2002 by Grantz et al. (entitled "Flow Re-Circulation With Radial Capillary Seal"), which is herein incorporated by reference.

FIELD OF THE INVENTION

The invention generally relates to electric motors and, more particularly, to electric motors for disk drives having fluid dynamic bearings.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks. For example, to achieve increased storage densities, the read/write heads must be placed increasingly close to the surface of the storage disk. This proximity requires that the disk rotate substantially in a single plane. A slight wobble or run-out in disk rotation can cause the surface of the disk to contact the read/write heads. This is known as a "crash" and can damage the read/write heads and surface of the storage disk, resulting is loss of data.

From the foregoing discussion, it can be seen that the bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces such as cones or spheres, or may alternately comprise fluid dynamic grooves formed on the members themselves. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeatable run-out. Thus, fluid dynamic bearings are an advantageous bearing system.

However, current fluid dynamic bearing designs are susceptible to problems caused by tolerance-induced variations in bearing (and bearing groove) geometry. These problems include large variations in pressure produced in the journal bearing and the entrapment of air bubbles in the fluid itself. Both of the stated problems may be avoided by providing a fluid dynamic bearing with a fluid re-circulation path to an external environment. In addition to purging air from the bearing, re-circulation can also eliminate undesirable pressure variations caused by bearing geometry tolerances. Re-circulation to an external environment is difficult to achieve, however, in existing fluid dynamic bearing designs utilizing capillary seals because it would require the formation of multiple cross holes in the bearing sleeve. The ends of some of these holes would have to be plugged and sealed after formation. Capillary seals remain desirable, however, because they achieve sealing with minimal use of axial space and provide high shock resistance.

Therefore, a need exists for a fluid dynamic bearing design that utilizes capillary seals and can effectively and efficiently achieve fluid recirculation. Furthermore, a bearing design that can do so without foregoing some of the advantages of conventional bearings is also desirable.

SUMMARY OF THE INVENTION

The invention provides a fluid dynamic bearing motor featuring a stationary assembly supported from a base, a rotating assembly supported on the stationary assembly, a fluid dynamic bearing in a gap between the stationary and rotating assemblies, a radial capillary seal is defined proximate a first end of the gap, and at least one re-circulation hole extending from the radial capillary seal to a second end of the gap.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
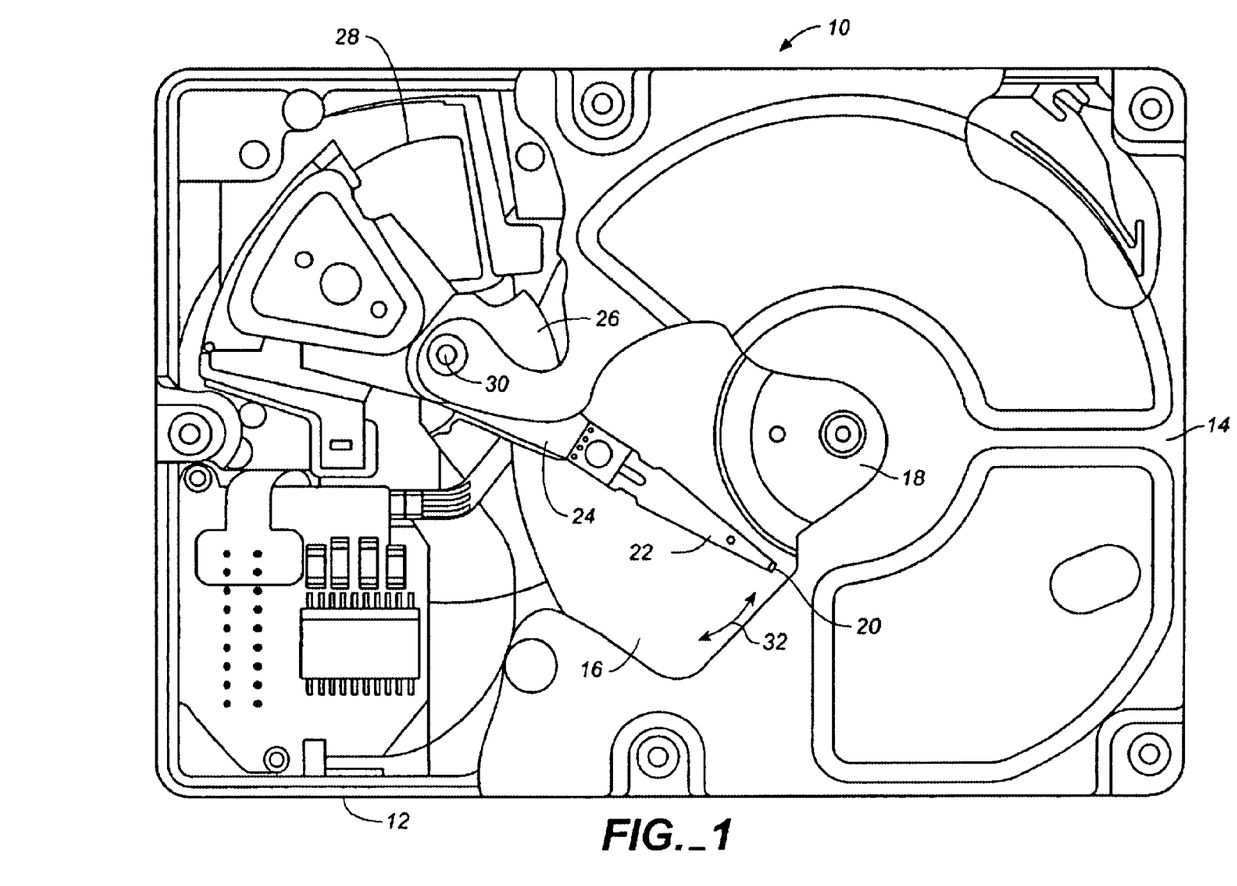
FIG. 1 depicts a plan view of one embodiment of a disk drive that comprises a motor in which the invention is used.
Figure 2A:
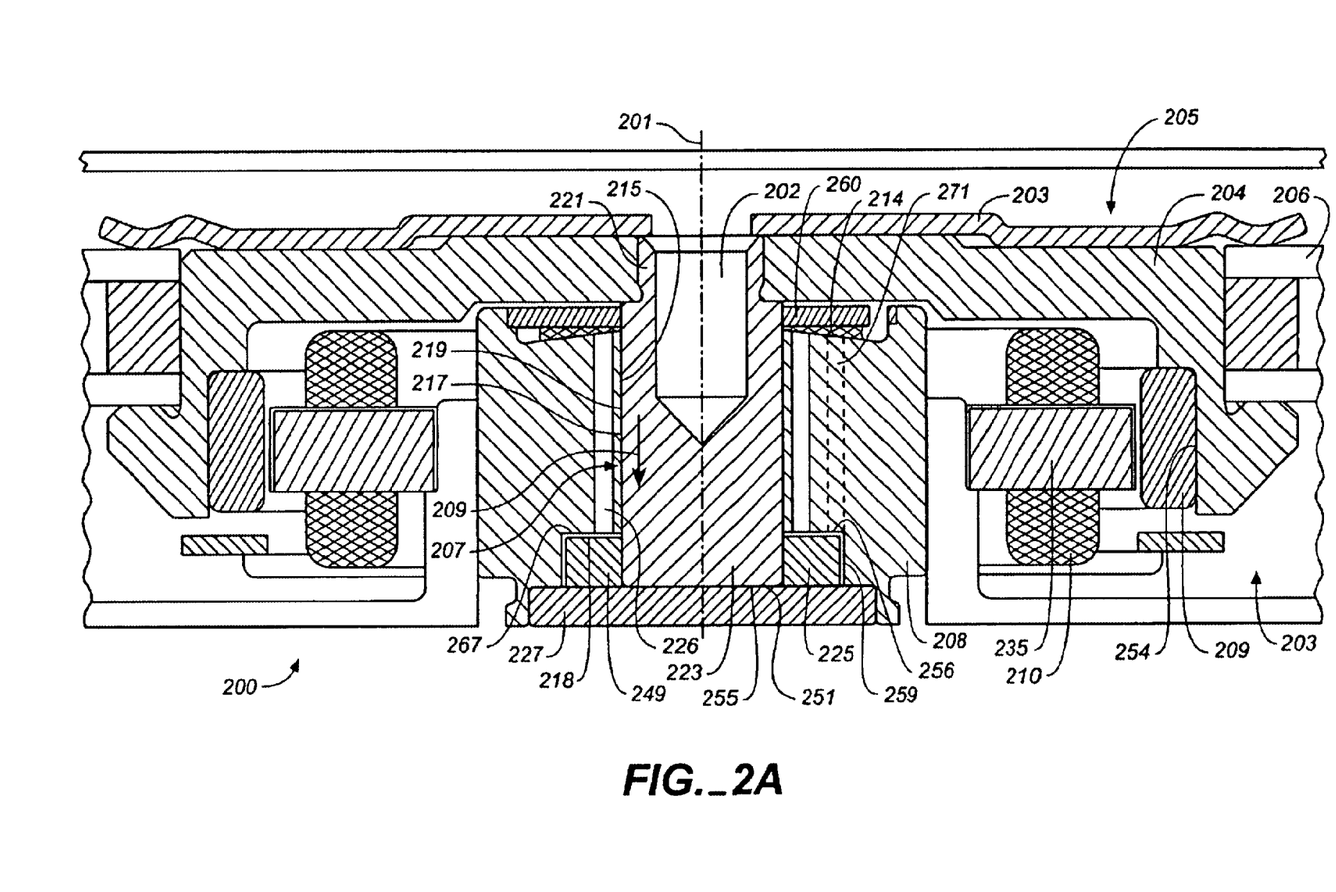
FIG. 2A depicts a partial cross-sectional view of one embodiment of a fluid dynamic bearing motor according to the present invention.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components-from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing. Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

FIG. 2A is a sectional side view of a fluid dynamic bearing motor 200 according to one embodiment of the present invention. The motor 200 comprises a rotating assembly 205, a stationary assembly 203, and a bearing assembly 207.

The rotating assembly 205 comprises a hub 204 that supports at least one disk 206 for rotation. The hub supports a magnet 209 on the inside circumferential surface 254 of the hub 204.

A shaft 202 is disposed axially through a bore 231 in the stationary sleeve 208 and supports the hub 204 for rotation. The shaft 202 comprises a first end 221 fixed to the hub 204 of the motor 200. The shaft 202 could be fixed to the hub 204, for example, by providing a threaded hole in the first end of the shaft and screwing the disc clamp 203 into place, or by press fitting on the shaft. A second end 223 of shaft 202 supports a circular thrust plate 225 affixed, for example by press fitting or forming, onto the shaft 202. An annular plenum 218 separates the thrust plate 225 from the sleeve 208. A stator 210 mounted on the base 12 cooperates with the magnet 209 in the hub 204 to induce rotation of the hub 204 relative to the sleeve 208. The stator 210 comprises a plurality of "teeth" 235 formed of a magnetic material such as steel, where each of the teeth 235 is wound with a winding or wire 237.

The fluid bearing assembly 207 is formed in a journal (or gap) 217 defined between the facing surfaces of the inner diameter 215 of the sleeve 208 and the outer diameter 219 of the shaft 202. A fluid such as air, oil or gas is disposed between the shaft 202 and the sleeve 208. The journal 217 further comprises dynamic grooves of a type known in this technology formed on one or the other of the interfacial surfaces 215, 219 (in FIG. 2A, the fluid dynamic grooves are formed on the outer diameter 219 of the shaft 202). In addition, fluid dynamic grooves are formed on a first surface 255 of the thrust plate 225 opposite the journal 217 to form an active thrust bearing. A second side 267 of the thrust plate 225 facing the journal 217 could be grooved as well.

As the hub 204 rotates, fluid 214 is pumped by the journal grooves toward the plenum 218 and thrust plate 225. The thrust bearing grooves which preferably form an inward-pumping spiral pattern, typically pump the fluid 214 towards the center of the thrust plate.

The plenum 218 connects the journal bearing to one or more fluid recirculation paths 226 defined through the sleeve 208. The fluid re-circulation paths 226 return fluid to a radial capillary seal 216 defined by facing surfaces of a shallow conical surface 217 on an axial end surface of sleeve 208 and shield 260 supported from the same sleeve. The pressure gradients in the fluid (where the fluid is a liquid) force bubbles out the re-circulation path 226 and into the radial capillary seal 216. The radial capillary seal 216 is defined between the sleeve 208 and shield 260 whose diverging surfaces retain fluid 214 by means of meniscus surface tension. The radial capillary seal 216 also comprises a fluid reservoir (and also a fluid fill hole) for the bearing assembly 207. The fluid recirculation path 226 also enables that the pressure due to asymmetry of the journal grooves is reduced to essentially atmospheric pressure. The flow resistance of the re-circulation path 226 is significantly lower than that of the journal grooves so all pressure drops occur across the journal 217.

Figure 2B:
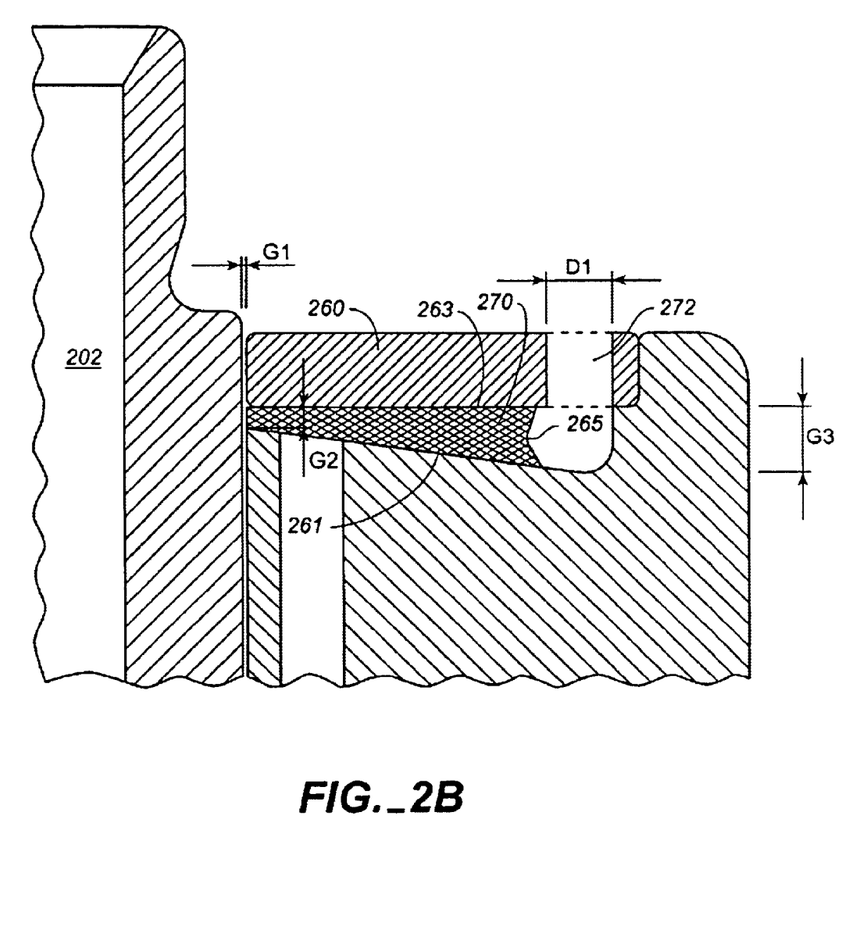
FIG. 2B depicts an embodiment of a radial capillary seal for use in the motor according to embodiments of the present invention.

FIG. 2B illustrates an embodiment of a radial capillary seal 216 and demonstrates conditions that should be met for use with aspects of the invention. A first gap $G_1$ is defined between the shaft 202 and the shield 260, and establishes a very narrow capillary seal. A second gap $G_2$ represents the width of the seal 216 between the top of the sleeve at or near to the entrance to the journal and a facing surface 263 of the shield 260 at about that point. It can be seen from the figure that the surface 261 is angled away from axial shield surface 263 to promote formation of the meniscus 265 across the end of the fluid in reservoir 270; alternatively, the shield surface could be at an angle, or both could be at a shallow angle to a horizontal axis. Gap $G_1$ should be smaller than gap $G_2$ so that the fluid 214 flowing into the radial capillary seal 216 is directed into the reservoir 270 and not out of the gap $G_1$. The reservoir 270 converges in an angle toward the shaft 202 so that fluid 214 is drawn toward the shaft 202 by capillary forces. A third gap $G_3$ represents the width of the reservoir 270 defined by radial capillary seal 216 at its widest point. Gap $G_3$ should be smaller than the diameter $D_1$ of a vent/fill hole 272 in the seal 216, so that fluid 214 in the vicinity of vent/fill hole 272 is drawn away, into the reservoir 270.

Referring back to FIG. 2A, the complete recirculation scheme which appears therein as well as in several other embodiments to follow is used, in this instance, in a single sided magnetically preloaded thrust bearing configuration. The thrust bearing grooves 249 which are of a type well known in this technology are defined in the gap 251 between the thrust plate 225 and the counterplate 227. Typically they will be on the surface of the counterplate. The top surface 256 of thrust plate 225 is typically ungrooved, and operates with a relatively large gap 259, for power reduction purposes.

Considering FIGS. 2A and 2B together, it can be seen that oil filling could be done by injecting a fixed amount of oil into the radial capillary seal through fill hole or holes 272. This is made possible by the fact that this design approach purges air, very effectively, unlike conventional single thrust plate designs which are open on one end. On injection of the oil or other fluid (in this case typically a liquid), capillary attraction fills the journal region 207, and recirculation of the fluid through the recirculation holes 214 purges air bubbles.

Asymmetry is designed into the journal grooving pattern 217 to establish a force in the direction of the arrow 209 to force oil to normally flow down the journal, away from the radial capillary seal and toward the thrust region at the opposite end of shaft 203. The fluid then flows from the shaft end through plenum 218 into the recirculation hole or holes 214, and then up the recirculation hole or holes 226 into the radial capillary seal volume. This flow direction causes a slight pressure increase in the volume or plenum region 218 which connects the bottom of the journal bearing to the entrance to the recirculation hole, extending over the top surface of the thrust plate. Any air bubbles trapped in this plenum region 218 will follow the decreasing pressure gradient up the recirculation hole and into the radial capillary seal. The converging shape of the walls 261, 263 of the horizontal capillary seal in the radial capillary seal will cause air bubbles to migrate to the meniscus 265 on the outer diameter of the oil volume, and then to leave the seal via the vent hole 272.

It should be noted that one or more recirculation holes 226 may be used, each extending substantially axially through the sleeve 208, and one or more vent holes 272 may be used. The flow resistance of the recirculation hole or holes is much lower than the flow resistance of the journal bearing gap which results in the effective cancellation of any pressure buildup along the length of the journal. That is, the journal is effectively short-circuited by the recirculation holes, ensuring that the pressure at the bottom of the journal in the plenum region 218 is forced to be virtually atmospheric, the static pressure in the radial capillary seal.

It should be noted that the design of FIG. 2A could also be a dual sided conventional thrust plate, with grooves as known in this technology on the upper surface 267 of thrust plate 225 as well as the lower. In this embodiment, also, the recirculation holes 226 could be located anywhere along the top surface of the thrust plate 225, including the region above the thrust plate outer diameter. Thus as shown in FIG. 2A, the recirculation hole 271 could be aligned with both the outer diameter of the thrust plate and the gap 259 between this outer diameter and the facing inner surface of the sleeve; this arrangement would still be effective. In fact, the recirculation holes could even be radially aligned with the gap which is radially outside the thrust plate.

As further alternatives, the dual thrust plate could be used with chevron patterns, and with recirculation holes in the thrust plate. The recirculation holes whether in location 226, 271 or in radially in-between, can be located at various radii from the central axis 201 of the shaft as long as they are in communication with the oil in the reservoir of the capillary seal.

Especially in a design where only a single side of the thrust plate is grooved, typically one of the surfaces between the end of the shaft and the counterplate, that an inward pumping spiral thrust pattern is utilized as a preferred embodiment. Such a pattern will cause a pressure gradient resulting increasing pressure from the thrust surface outer diameter to the inner diameter, causing air bubbles to travel toward the plenum 218 and then into the recirculation holes 214.

Figure 3:
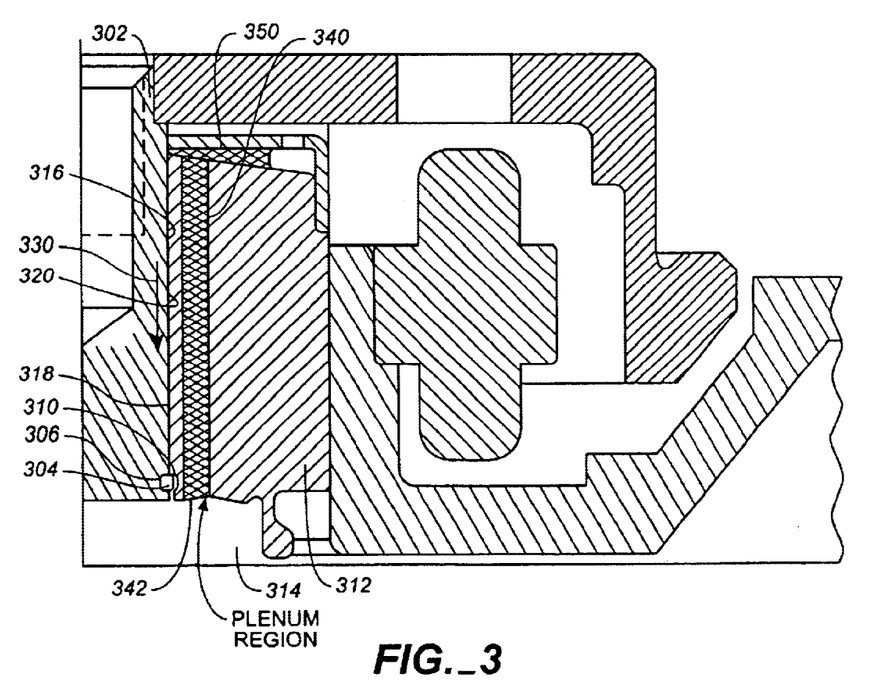
FIG. 3 depicts a partial cross-sectional view of second embodiment of a fluid dynamic bearing motor according to the present invention.

FIG. 3 shows another embodiment wherein the shaft 302 does not have a thrust plate but rather is held in place axially by a ring clip 304 captured in a groove 306 of shaft 302. The ring clip 304 engages a shoulder 310 of sleeve 312 to restrain axial movement of the shaft away from counterplate 314. In this embodiment as in the embodiments described above an asymmetric journal bearing 316, 318 is incorporated in the gap 320 between the outer surface of the shaft 302 and the inner surface of the sleeve 312. This journal bearing 316, 318 creates a pumping pressure in the direction of the arrow 330 toward the counterplate and bottom surface of the shaft.

As in the embodiments above, one or more recirculation holes 340 are provided coupling the end of the shaft and the plenum region 342 between the end of the shaft and the entrance to the recirculation hole to a radial capillary seal 350 as described with respect to FIG. 2B.

An inward pumping spiral thrust pattern on the bottom of the shaft, in the preferred embodiment again creates a pressure gradient resulting in increasing pressure from the thrust surface OD to ID, causing air bubbles to travel into the plenum region 342 and then into recirculation holes 340 to travel to the radial capillary seal 350 and be discharged.

Figure 4:
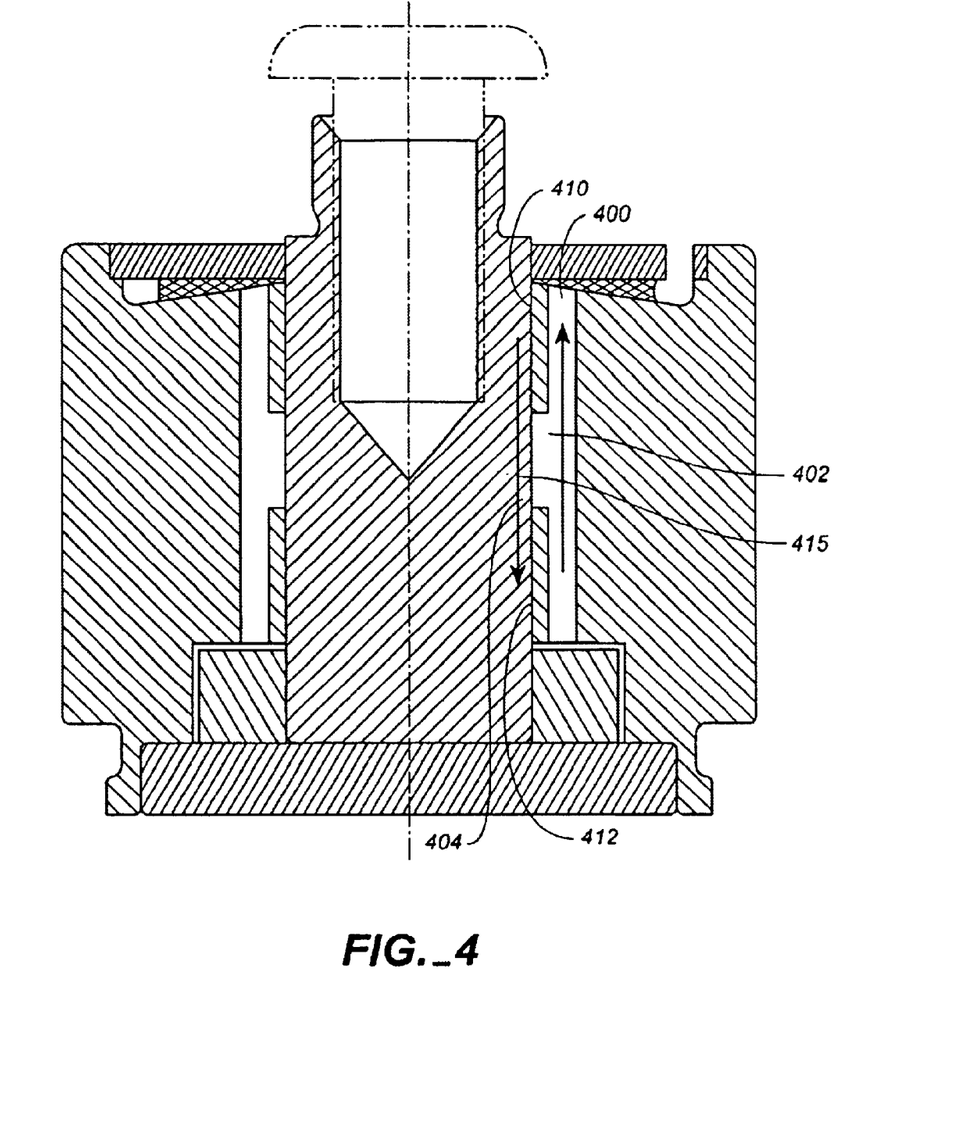
FIG. 4 depicts a partial cross-sectional view of third embodiment of a fluid dynamic bearing motor according to the present invention.

FIG. 4 shows an alternate plenum configuration, especially useful with the design of FIG. 2A. In this configuration, the recirculation holes 400 which are otherwise located as described with respect to FIG. 2A intersect a plenum region 402 which is coupled to the gap 404 between the grooved journal bearing regions 410, 412. The journal bearings normally cooperate to pump fluid in the direction of the arrow 415. However, the journal bearing groove pattern 412, considered independently, exerts a small net pumping pressure against the direction of arrow 415. In this way, a central pressure is established, between the bearings whereby each of the journal bearings 410, 412 may be independently short circuited or vented to near atmospheric pressure. This approach prevents one journal bearing from pulling the oil from the other journal bearing to sub-atmospheric pressure. In other respects, the design is the same as found in FIG. 2A.

Figure 5:
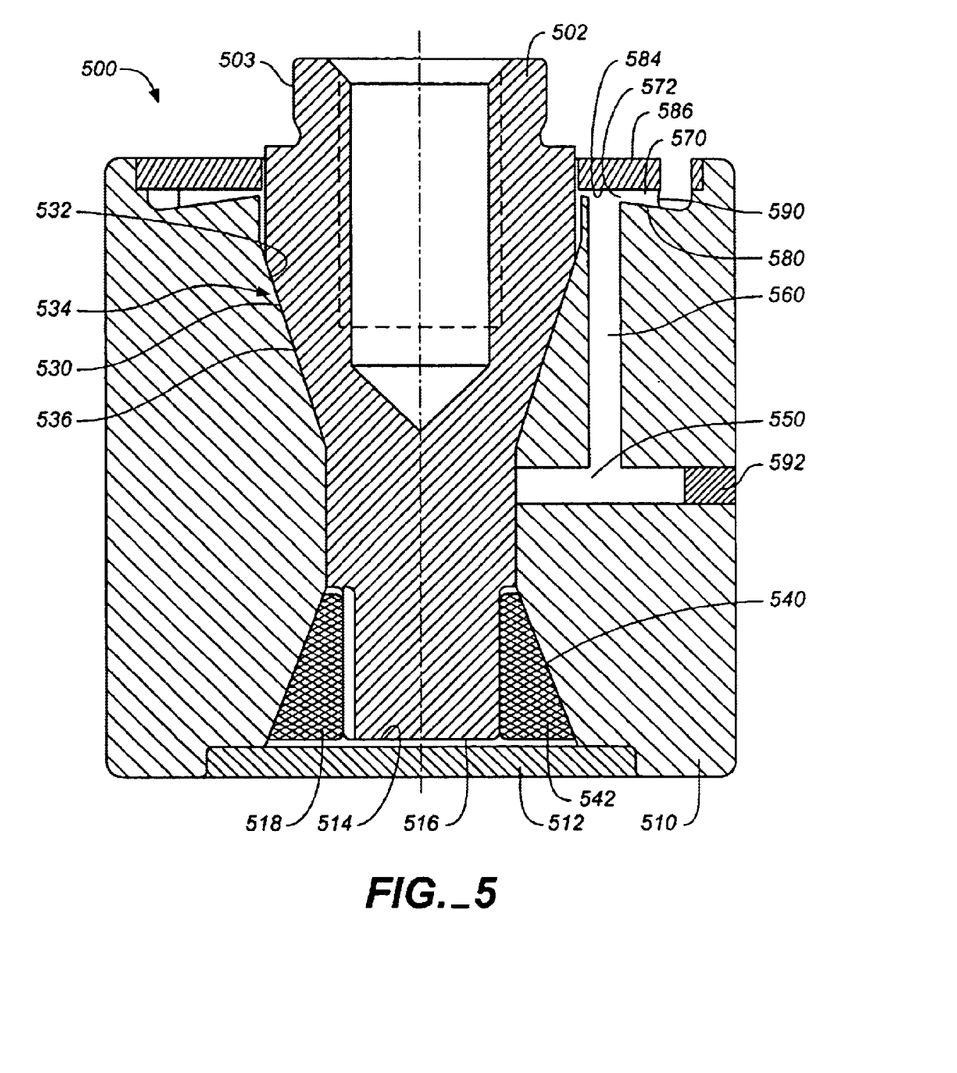
FIG. 5 depicts a partial cross-sectional view of a fourth embodiment of a fluid dynamic bearing motor according to the present invention.

A further embodiment of a fluid dynamic bearing motor 500 is shown in FIG. 5. The motor is a rotating shaft conical fluid dynamic bearing motor, comprising a rotating shaft 502 attached at a first end 503 to a hub as shown in the earlier figures. As also shown in those figures, the hub further comprises a back iron with a magnet affixed thereon that cooperates with a stator supported from base 12 to induce rotation of the hub. A stationary sleeve 510 is supported from the base, and supports a seal plate 512 which includes a surface 514 facing the bottom surface 516 of the shaft 502 across a gap 518.

To support relative rotation of the shaft 502 relative to the sleeve 510, a first conical bearing 530 is formed by grooving one of the surfaces 532, 534, of the shaft and sleeve respectively which define the gap 536. A second conical bearing 540 is similarly defined at the opposite end of the shaft, using a conical element 542 which is press fitted or otherwise affixed to the shaft 502. Grooves are well known in the technology are used to create appropriate pressure gradients to support stable rotation of the hub and the shaft 502 relative to the sleeve 510. The groove patterns may both pump toward the center region of the shaft which is typically ungrooved. Alternatively, the grooves on the cone 542 may create a net pressure toward the case; the fluid would recirculate through bores or holes 543 to the top of cone 540. In either case the net pressure would be toward the base of the bearing.

A plenum 550 is defined in the radial direction through the sleeve 510 and is disposed between the conical bearings 530, 540 and coupled an ungrooved region of the shaft. The plenum 550 connects to a fluid recirculation path 560 which functions in the manner described with respect to FIGS. 2A and 2B above. The fluid recirculation path 560 returns fluid from the conical bearings 530, 540 to a radial capillary seal 570 as described with respect to FIG. 2B, the recirculation path 560 returning the fluid to a region 572 which lies within the fluid reservoir of the radial capillary seal 570.

This radial capillary seal is defined between a generally axial surface 580 of the sleeve 510, and a facing surface 584 of a shield 586. The wall surfaces 584, 580 diverge axially as described above in order to create a meniscus 590 at the end of reservoir 572 to maintain the fluid therein. By providing this recirculation path, bubbles which would otherwise become entrained in the fluid over the conical bearings 530, 540 are circulated out of the system through the plenum 550, the recirculation path 560 and the radial capillary seal 570. As plug 592 is placed in the radially outer end of the plenum channel 550 so that fluid does not escape from the described system to the outside atmosphere.

The present invention represents a significant advancement in the field of fluid dynamic bearing motors. A fluid dynamic bearing is provided using a radial capillary seal that uses minimal axial space and affords high shock resistance. An effective and efficient circulation means is incorporated in the embodiments described to purge air from the fluid and eliminate undesirable pressure variations in the bearing, improving the functionality of prior designs. The horizontal radial capillary seal combined with the recirculation principles described above and the asymmetry and forced flow of the rotating shaft design provides a self-purging design which does not require vacuum filling. The plenum locations along the recirculation paths alleviate pressure variations due to bearing tolerance designs, and further enhances the air purging principles.

When used with a single thrust plate design where the fluid is a liquid, the circulation flow has additional benefits in purging air bubbles which are driven to the thrust plate outer diameter by an appropriate spiral thrust grooving design. Further, the principles above are also applicable to conical style designs.

What is claimed is:

1. A disk drive motor comprising:
   a stationary assembly having a sleeve supported from a base;
   a rotating assembly supported upon the stationary assembly, the rotating assembly comprising a shaft having a thrust plate at an end thereof, wherein facing surfaces of the stationary assembly and the rotating assembly define a gap therebetween;
   a fluid dynamic journal bearing positioned in the gap between the rotating assembly and the stationary assembly;
   a radial capillary seal defined proximate to a first end of the gap distal from the thrust plate;
   at least one re-circulation path extending from the radial capillary seal toward the thrust plate and connected to the gap.

2. The disk drive motor according to claim 1, further comprising:
   a magnet assembly supported by the rotating assembly;
   a stator supported by the stationary assembly that cooperates with the magnet assembly to induce rotation of the rotating assembly; and
   the fluid dynamic journal bearing pumping in a direction from the radial capillary seal toward the thrust plate, for establishing fluid flow through the fluid dynamic bearing.

3. The disk drive motor according to claim 2, wherein the fluid dynamic journal bearing further comprises:
   at least one set of fluid dynamic grooves formed on at least one of the facing surfaces of the stationery assembly and the rotating assembly wherein the fluid dynamic grooves are for pumping a fluid toward a second end of the gap.

4. The disk drive motor according to claim 3, wherein a plenum region couples the fluid from the fluid dynamic journal bearing to the at least one re-circulation path.

5. The disk drive motor according to claim 4, wherein the plenum is defined adjacent to a first axial surface of the thrust plate which faces the fluid dynamic journal bearing.

6. The disk drive motor according to claim 4, wherein the plenum is defined between two sets of fluid dynamic grooves on the facing surfaces of the rotating and stationary assemblies.

7. The disk drive motor according to claim 4, wherein the fluid pumped toward the second end of the gap is returned to the radial capillary seal through the at least one fluid re-circulation path and the plenum.

8. The disk drive motor according to claim 7, wherein the radial capillary seal includes a fluid retention region ending in a meniscus within a fluid reservoir, and the recirculation path extends to the fluid retention region.

9. The disk drive motor according to claim 5 wherein the recirculation path extends from a radial location at last partially overlying the first axial surface of the thrust plate.

10. The disk drive motor according to claim 9, wherein the radial capillary seal includes a fluid retention region ending in a meniscus within a fluid reservoir, and the recirculation path extends to the fluid retention region.

11. The disk drive motor according to claim 10, wherein the stationary assembly supports a counterplate adjacent to the thrust plate, one of the thrust plate and counterplate surfaces supporting a groove pattern for pumping fluid toward a central axis of the shaft.

12. The disk drive motor according to claim 11, wherein the groove pattern causes air bubbles to flow away from the central axis of the shaft toward the fluid recirculation path.

13. The disk drive motor according to claim 1, wherein the recirculation path extends from a radial location at last partially overlying the first surface of the thrust plate.

14. The disk drive motor according to claim 13 wherein the radial capillary seal includes a fluid retention region ending in a meniscus within a reservoir, and the recirculation path extends to the fluid retention region.

15. The disk drive motor according to claim 4 wherein the fluid dynamic grooves in the gap of the fluid dynamic journal bearing comprise a first and a second set of grooves having a net pumping pressure toward the thrust plate and a positive pressure in a region between the first and second sets of grooves in the gap, and wherein the plenum couples the positive pressure region to the fluid recirculation path.

16. The disc drive according to claim 15 wherein the plenum extends radially from the gap to the fluid recirculation path and the fluid recirculation path extends generally axially from the fluid reservoir of the radial capillary seal to at least partially overlie the thrust plate.

17. A disc drive motor comprising a sleeve supported from a base, a shaft axially disposed within the sleeve and supporting a hub for rotation, and a fluid bearing gap disposed between the shaft and the sleeve;
   a first conical fluid dynamic bearing at a first end of the shaft adjacent the hub;

a second conical fluid dynamic bearing at a second end of the shaft adjacent the base; and grooves on at least a surface of the first conical fluid dynamic bearing pumping toward a center section of the shaft.

18. A disc drive motor according to claim 17, further comprising a fluid radial capillary seal adjacent an end of one of the conical fluid dynamic bearings defining a radially directed fluid reservoir, and a fluid recirculation path extending from the fluid bearing gap to the fluid reservoir.

19. A disc drive motor as claimed in claim 17 including a plenum extending radially from the center section of the shaft the fluid recirculation path.

20. A disk drive motor comprising:

a stationary assembly having a sleeve supported from a base;

a rotating assembly supported upon the stationary assembly and comprising a shaft having a thrust plate at an end thereof;

a fluid dynamic bearing positioned in a gap between the rotating assembly and the stationary assembly;

a radial capillary seal defined proximate a first end of the gap distal from the thrust plate; and means for re-circulating a fluid from the gap to the radial capillary seal to remove bubbles entrained in the fluid.

21. A disc drive motor as claimed in claim 19 wherein the means for re-circulating a fluid comprises a fluid recirculation path extending generally axially through the sleeve to the radial capillary seal, and a plenum coupling the gap to the recirculation path.

* * * * *